United States Patent [19]

Steffen

[11] Patent Number: 4,571,922
[45] Date of Patent: Feb. 25, 1986

[54] METHOD AND APPARATUS FOR THE PREPARATION OF A SAUSAGE CASING PACKAGE

[76] Inventor: Remy Steffen, Aspres-sur-Buesch, France

[21] Appl. No.: 574,680

[22] Filed: Jan. 27, 1984

[30] Foreign Application Priority Data

Feb. 1, 1983 [FR] France .............................. 83 01901

[51] Int. Cl.⁴ ............................................. B65B 15/00
[52] U.S. Cl. ........................................ 53/397; 53/581;
17/42; 426/132; 426/140; 426/420
[58] Field of Search ................. 17/41, 42, 49; 53/397,
53/581; 138/118.1; 206/802; 426/105, 111, 132,
135, 138, 140, 284, 413, 414, 415, 420; 428/36

[56] References Cited

U.S. PATENT DOCUMENTS 1,876,279  9/1932  Dietrich .................................. 17/42
4,363,819 12/1982  Steffen .................................. 426/132

FOREIGN PATENT DOCUMENTS 1532003 10/1970  Fed. Rep. of Germany ...... 426/140

Primary Examiner—Robert L. Spruill
Assistant Examiner—Michael D. Folkerts
Attorney, Agent, or Firm—Karl F. Ross; Herbert Dubno

[57] ABSTRACT

A sausage casing package is formed utilizing a tool constituted by a rigid tube having a low-friction surface. The folded casing support is introduced into the tube and the casing sections as applied with the assembly of casing sections being drawn off the tube simultaneously with the withdrawal of the casing support from the tube to transfer the pleated and interfitted casings onto the support.

5 Claims, 7 Drawing Figures

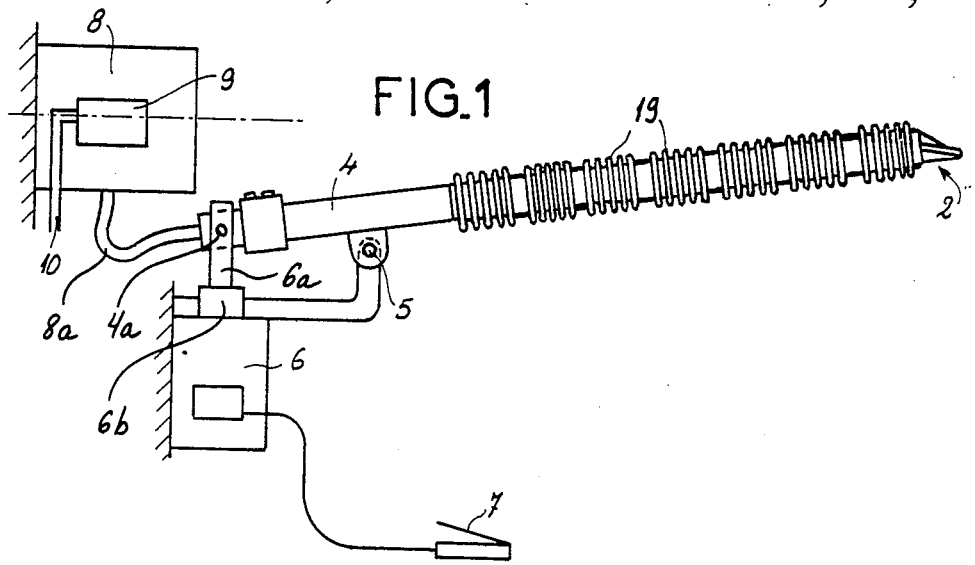
FIG.1
FIG.2
FIG.4
FIG.3
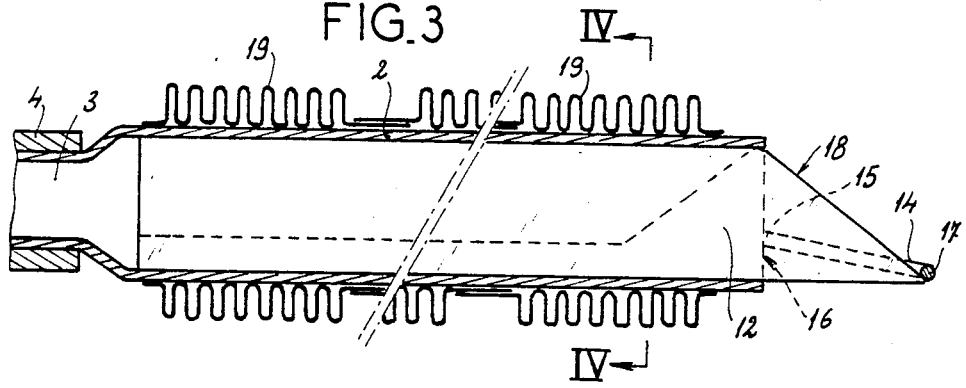

METHOD AND APPARATUS FOR THE PREPARATION OF A SAUSAGE CASING PACKAGE

FIELD OF THE INVENTION

My present invention relates to an apparatus for the preparation of a sausage casing package, i.e. a multiplicty of telescopingly interfitted accordion-pleated sausage casings on a common support so as to enable the successive feeding of such casings by the application of a package to a sausage-casing filling machine.

BACKGROUND OF THE INVENTION

In my U.S. Pat. No. 4,363,819, for example, there is described a process for the preparation of a number of accordion-pleated sausage casings carried by a common support, referred to as a sleeve.

The sausage casings can be composed of sheep, goat, pig or cow intestine and generally are prepared in advance for delivery to the sausage-casing filling machine and, by the use of the method and package of that patent, a plurality of such casings on a common support can be positioned at the mouth of the filling machine so that the casings are successively filled with the sausage meat.

The several sausage casings are fitted one over the other and thus are telescopically interfitting at the ends at which the casings are joined, by being drawn onto the support which can be a sleeve of synthetic resin material which is flexible, smooth and relatively soft. Because of the telescoping relationship of the overlapping ends, i.e. the interfitting portions of successive sausage casings, overlap by several centimeters with the prior casings, in the sense of filling.

The advantage of the method and apparatus of the aforementioned patent is that the preformed package of sausage casings on a common support can be prepared in advance and readied at the location of the sausage casing filler so that the entire package can be introduced into place to permit the sausage casings thereof to be successively filled.

Sausage casing handling is simplified, the down time of the filling machine is minimized and the production rate can be increased substantially.

In one embodiment of the method described in this earlier patent, the synthetic resin soft and yieldable sleeve is drawn onto a rigid tool (mandrel) having a cross section substantially identical to that of the support. Warm water can be passed through the sleeve to facilitate softening of the sausage casing sections, the sausage casing sections can be drawn onto the sleeve and, after overlapping of the ends, the sections can be bonded together. The operation in which the sausage casings are drawn onto the sleeve is relatively delicate because of the poor slidability of the casings on the sleeve. Since the latter is generally composed of polyethylene and can have the same cross section as the internal cross section of the casing, the act of drawing the casing onto the polyethylene sleeve may damage the sleeve. The danger of such damage requires that the casings be drawn onto the sleeve with great care and hence the entire operation is comparatively slow.

OBJECTS OF THE INVENTION

It is the principal object of the present invention to overcome the disadvantages outlined above of the earlier method and apparatus for preparing packages of sausage casings or sausage-casing sections.

Another object of this invention is to provide an improved apparatus for producing a sausage casing package consisting of a number of accordion-pleated sausage casing sections or sausage casings on a common support which does not require the delicate manipulations hitherto considered to be necessary, which increases the rate of production of such packages and which has a reduced tendency to distort the support.

SUMMARY OF THE INVENTION

These objects and others which will become apparent hereinafter are attained, in accordance with the present invention, in an apparatus in which, in place of a mandrel over which the support sleeve is drawn, an elongated hollow tubular member is provided to receive the sausage casings or sausage casing sections and the support is introduced into the interior of this tubular tool.

According to the invention, therefore, the apparatus of the invention comprises a rigid tubular tool whose external surface has a low coefficient of sliding friction, i.e. has excellent sliding characteristics, and a length slightly less than the length of the support sleeve and the external cross section which can be substantially less than the section of the support.

One end of this tool is provided with means for affixing it to a support by means of which the tool can be manipulated, e.g. in the same manner as the mandrel of the patent, while the other end of the tool is open to permit insertion into the central cavity of this tool, of the casing support, which can be folded longitudinally for this purpose.

Advantageously, the tube is composed of highly polished stainless steel.

It has been found to be advantageous after folding the casing support longitudinally, to insert it into the cavity of the tube, the sections of sausage casings being then drawn onto the tube in succession and overlapped in the manner described. This latter operation is extremely simple because the external cross section of the tool can be less than that of the sausage casing and, furthermore, because the surface of the tool allows the sausage casings to slide readily on the latter. When the operation whereby the sausage casings are applied or threaded onto the tool is terminated, the casing support is withdrawn from the tube through the open end simultaneously with a displacement of the accumulated surface casing on the external surface of the tube thereby transferring the accordion-pleated sausage casings to the casing support. The withdrawal of the casing support and the displacement of the casings from the surface of the tube are effected at the same speed assuring that the assembly of sausage cases will retain its shape upon the casing support.

According to a feature of the invention, the free end of the tool is provided with a guide generally of V-shape and formed by a wire, fixed, e.g. by welding, to the edge of the mouth of the tube.

Since advantageously the tube can be of oval cross section to facilitate the protection of the casing support in its folded condition, the ends of the V-shaped wire guide can be affixed to the regions of the mouth of the tube extending along their greater dimensions of the tool cross section, i.e. the substantially vertical parts of the oval. The vertex of the guide is located along a generatrix of the tube in a median longitudinal plane of the tube and the guide.

The guide facilitates insertion of the folded casing support and also facilitates the spreading of the sausage casings as they are drawn onto the tube and thereby also facilitates the threading action.

This latter operation is facilitated even more if an end of the casing support is permitted to project from the mouth of the tube and is cut so that it has an inclined flank reaching substantially to the aforementioned vertex, the bias-cut edge of the casing support lying in a plane substantially perpendicular to that of the guide.

BRIEF DESCRIPTION OF THE DRAWING

The above and other objects, features and advantages of the present invention will become more readily apparent from the following description, reference being made to the accompanying drawing in which:

FIG. 1 is a view in elevation illustrating the apparatus of the invention in a highly diagrammatic or schematic form;

FIG. 2 is a perspective view of the tool onto which the sausage casings are drawn after insertion of the support;

FIG. 3 is a longitudinal (axial) cross section through this tube after application of a number of sausage casings thereto;

FIG. 4 is a cross sectional view taken along the line IV—IV of FIG. 3; and

SPECIFIC DESCRIPTION

Figures 5, 6, 7:
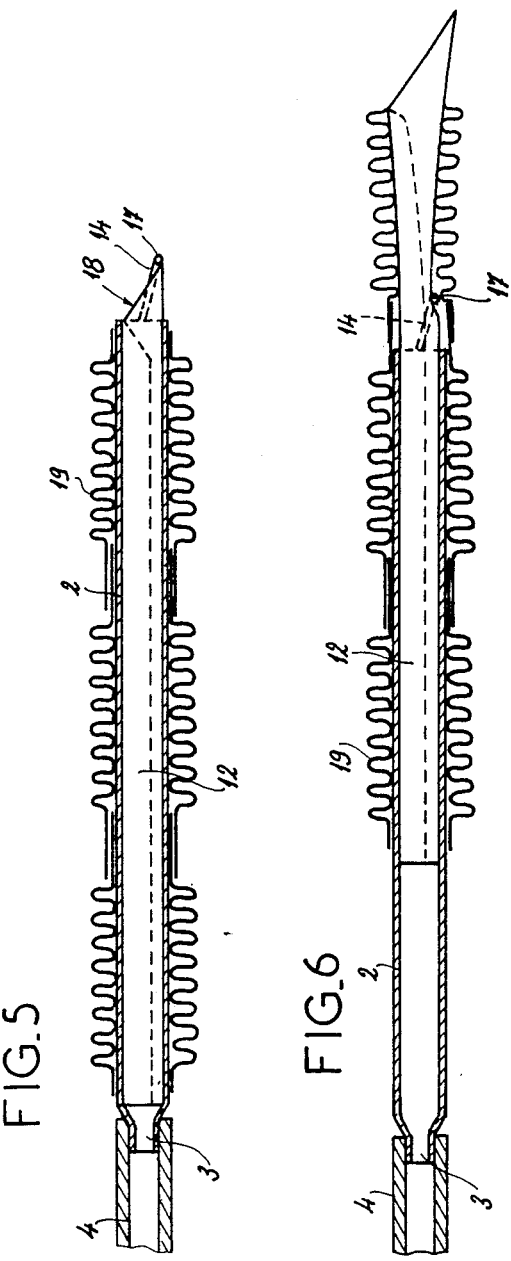
FIGS. 5 through 7 are three axial sections showing successive steps in the production of the package from the casing support and the accordion-pleated sausage casing.

At the outset it should be pointed out that the apparatus of the present invention, apart from the differences already noted, wherein a highly polished tube serves directly to receive the sausage casings and the casing support introduced into the tube, is operated or used in the manner described in the aforementioned patent and thus is equipped with a water supply unit and means for swinging the tube or tool about a horizontal axis.

More particularly, the tool 2 is composed of stainless steel and is highly polished in its outer surface 2a while being provided at one end with a shank 3 of reduced cross section which can be inserted into a tool holder 4. The tool holder 4 is swingable about the horizontal axis 5 and is pivotally connected at 4a to a piston rod 6a of the piston 6b of a fluid-operated cylinder 6 which can be actuated by means of a pedal 7.

The tool is fed with water from a reservoir 8 provided with a float controlled valve 9 regulating the feed of water via line 10 to this reservoir. A flexible pipe 8a serves to connect the bottom of the reservoir to the end of the support 4 which communicates with the shank 3. In its upper position shown in FIG. 1, the mouth of the tube 2 lies above the level of liquid in the reservoir 8 and thus water does not emerge from the mouth. When the tool is tilted downwardly, however, and the mouth lies below the level in the reservoir, water flows from the mouth to soften the sausage casing which can be drawn onto the tube 2.

According to an essential feature of the invention, the tool 2 is composed of rigid material and has a good coefficient of sliding friction, i.e. low friction along its surface 2a. The length of this tool is slightly greater than that of a casing support 12 which is adapted to be folded and inserted into the tube 2 and upon which the pleated and overlapped sausage casings are to be ultimately mounted to form the package shown in FIG. 7.

The tool 2 has an oval cross section with the internal cross section being substantially less than the cross section of the expanded support 12. The tool 2 thus has an internal cavity 13 in which the casing support 12 can be received after having been folded longitudinally.

The free end of the tube 2 is provided with a guide 14 constituted by a wire bent into the general configuration of a V and whose free ends 15 are fixed symmetrically to the two substantially vertical boundaries 16, e.g. by welding, these boundaries extending generally in the major dimension of the oval.

The vertex or central point 17 of the guide is located along the generatrix of the tube or tool lying in the longitudinal median plane of the guide. Since the ends 15 are affixed to the tube 2 above the low point the guide lies in a plane which is slightly inclined to the horizontal.

This guide does not block the mouth 13 of the tube but facilitates the folding and insertion of the casing support and its retraction. When the casing support is inserted into the tube 2, a portion thereof can extend from the mouth and is cut at a bias so that its bias-cut edge 18 lies substantially in the longitudinal median plane of the guide, perpendicularly to the plane of the guide and assists in the spreading of the sausage casings as it is drawn onto the tube.

In operation, after insertion of the casing support, the sausage casings 19 are drawn in succession into the tube 2 and are accordion-pleated thereon with each successive casing having its end drawn over the end of a casing previously applied to the tube thereby forming the overlap previously described.

When the threading operation is terminated, i.e. the last sausage casing has been drawn onto the tube, as can be seen in FIG. 5, I can withdraw the casing support 12 from the interior of the tube and the assembly of casing 19 from the exterior of the tube simultaneously and at the same speed (FIG. 6) so as to form the package illustrated in FIG. 7. The resulting package can then be utilized in the manner described for the package of sausage casings in the casing support sleeve of the aforementioned patent.

It is apparent that the apparatus of the invention greatly simplifies the formation of such casing packages and especially permits the assembly of such packages with considerable speed of efficiency. Naturally, the tube 2 can be coated with a low friction material such as polytetrafluoroethylene if desired.

I claim:

1. A method of forming a successive casing package which comprises the steps of:
    longitudinally folding an elongated sausage casing support;
    inserting the longitudinally folded sausage casing support into a tube having a low-friction external surface;
    threading directly onto said tube a succession of sausage casings and pleating each sausage casing as it is drawn onto said tube while fitting each successively threaded sausage casing partly over an end of a previously threaded sausage casing to form an assembly of sausage casings directly on said tube; and
    simultaneously withdrawing said casing support from said tube and drawing said assembly off said tube and onto the withdrawn support thereby transferring said assembly to said support and forming said package.

2. In an apparatus for producing a sausage casing package in which a plurality of sausage casings are carried on a casing support in an accordion-pleated and overlapping fashion, the improvement which comprises a tool for positioning said casing with respect to said casing support so as to enable said casings to be transferred to said support, said tool comprising a rigid tube of oval cross section having a low-friction external surface adapted to directly receive said casings, a length slightly less than the length of said casing support, means at one end of said tube for mounting same in a tube holder, and a central cavity in said tube adapted to receive said casing support in a longitudinally folded state, said tube having a mouth at its opposite end through which said casing support is inserted into and withdrawn from said cavity, further comprising a guide formed by a bent wire and of a V-configuration having ends fixed to said tube along flanks of the mouth extending in the major dimension of said oval whereby said guide lies in a plane inclined to the axis of said tube, the vertex of said guide lying substantially along a generatrix of said tube in a longitudinal median plane thereof.

3. The improvement defined in claim 2 wherein said tube is composed of highly polished stainless steel.

4. The improvement defined in claim 2 wherein said casing support is cut at a bias and projects through said mouth with a bias-cut edge lying in said longitudinal median plane and in a plane perpendicular to the plane of said guide.

5. The improvement defined in claim 4 wherein said bias-cut edge extends to said vertex.

* * * * *